United States Patent [19]

Nishikawa et al.

[11] Patent Number: 4,502,132

[45] Date of Patent: Feb. 26, 1985

[54] POWER SWITCH APPARATUS

[75] Inventors: Akira Nishikawa; Toru Saito; Kenichi Otsuka, all of Amagasaki, Japan

[73] Assignee: Mitsubishi Denki Kabushiki Kaisha, Tokyo, Japan

[21] Appl. No.: 539,057

[22] Filed: Oct. 4, 1983

[30] Foreign Application Priority Data

Oct. 9, 1982 [JP] Japan ............................... 57-178029

Apr. 29, 1983 [JP] Japan ............................... 58-76707

[51] Int. Cl.[3] ............................................ H02B 1/04

[52] U.S. Cl. .................................... 361/332; 361/131; 361/132; 361/333; 361/429; 200/48 R

[58] Field of Search .............. 200/48 R, 48 P, 50 AA, 200/50 R, 148 R, 148 B; 307/113, 150; 361/332–335, 131, 132, 340, 376, 417, 419, 420, 428, 429

[56] References Cited

U.S. PATENT DOCUMENTS

| | | | |
|---|---|---|---|
| 3,364,398 | 1/1968 | Stipcevich | 361/429 |
| 3,787,711 | 1/1974 | Bright | 361/333 |
| 4,367,512 | 1/1983 | Fujita | 361/335 |

*Primary Examiner*—G. P. Tolin
*Attorney, Agent, or Firm*—Lowe King Price & Becker

[57] ABSTRACT

A supporting insulator (9) to support the driving mechanism (6) of a disconnect switch part (100) and a supporting insulator (9) of a breaker (10) are unified. The heights of the fixed contact (4) and the driving mechanism (6) of the disconnect switch part (100) as well as the height of the upper end of the common supporting insulator (9) supporting the breaker (10) are substantially the same. Setting area is thus decreased, while ensuring a high spatial insulation distance.

12 Claims, 7 Drawing Figures

POWER SWITCH APPARATUS

BACKGROUND OF THE INVENTION

1. Field of the Invention

The present invention relates to a power switch apparatus comprising a combination of a breaker part and a disconnect switch part or a disconnect switch part with a lightning arrester therein wherein the parts are independently formed and are in the vicinity of and electrically connected to each other.

2. Description of the Prior Art

A typical power switch apparatus of the prior art is shown in a side elevation view FIG. 1, wherein on a frame 1, first and second supporting insulators 2 and 3 are mounted. The first supporting insulator 2 may be a known lightning arrester, which contains a known lightning arrester element, such as a ZnO element inside the first supporting insulator 2. Hereinafter, the term "first supporting insulator" will refer to either a simple supporting insulator or a lightning arrester containing the lightning arrester element 22 in a supporting insulator.

A fixed contact 4 having a terminal 4*a* to be connected to a receiving line 11 is mounted on the first supporting insulator 2, and a driving mechanism 6 for driving a moving contact 5 is mounted on the second supporting insulator 3 which holds the driving mechanism in a manner to prevent its horizontal rotation. One end of the moving contact 5 is operatively pivotted by the driving mechanism and the other end of the moving contact 5 is to be connected to and disconnected from the fixed contact 4 by operation of the driving mechanism 6. A driving insulator 7 is mounted on the frame 1 at a predetermined distance from the second supporting insulator 3, in a manner to be rotatingly driven by means of a driving motor (not shown in the drawing) or other suitable mechanism to drive the moving contact 5. The moving end of the moving contact 5 is thereby controllable to either separate from or contact the fixed contact 4, to disconnect or connect a circuit. In other words, the components mounted on the frame 1 constitute a disconnect switch part 100, and the driving mechanism 6 and the driving insulator 7 constitute an operating mechanism of the disconnect switch part 100.

A gas-breaker 10 of an insulator type is mounted on a supporting insulator 9, which is disposed apart from the supporting second insulator 3. A lower terminal 10*b* of the gas-breaker 10 is connected through a connection wire 12 to the moving contact, and an upper terminal 10*a* of the gas-breaker 10 is connected to a feeder line 13. A driving motor 14 is provided at the base of the supporting insulator 9 for driving the breaker 10 via a driving rod (not shown in the drawing) in the supporting insulator 9. The components disposed on and under the supporting insulator 9 thus constitute a breaker part 200.

In the power switch apparatus of such prior art, the disconnect switch part 100 and the breaker part 200 are, although electrically interconnected, built in separate groups. It is necessary to provide sufficient room between the disconnect switch part 100 and the breaker part 200, and also around the first supporting insulator 2, the second supporting insulator 3, the driving insulator 7, the frame 7 and the driving motor 14 to enable several workers to work between and around these components; such power switch apparatus are very large and the setting-up requires several workers to work around the components. As gas power switch apparatus comprising a combination of a disconnect switch and breaker in a common gas tank become popular, a demand for reduced size of the set-up area (one advantage of the gas power switch apparatus) becomes the general trend. This is also true for the power switch apparatus comprising a separate disconnect switch part and breaker part. However, as the distance between the disconnect switch part 100 and the breaker part 200 in the conventional power switch apparatus is reduced, the closeness of the disconnect switch part 100 and the breaker part 200 tends to reduce spatial insulation distances between the frame 1 (at ground potential) and the terminal 10*b* of the high tension as well as between the terminal 10*a* of the breaker 10 and the driving mechanism 6, which are to assume different potentials upon breaking of the breaker. Accordingly, mere shortening of the distance between the disconnect switch part 100 and the breaker part 200 is not practical; a considerable distance between them is necessary.

SUMMARY OF THE INVENTION

Therefore, an objective of the present invention is to provide an improved power switch apparatus of the type including a disconnect switch part and a breaker part, which enables highly efficient setting-up in a small area of installation and ease of transportation while ensuring sufficient spatial insulation distance.

This objective can be achieved by adopting a supporting insulator which supports the breaker part and also prevents horizontal rotation of the driving mechanism of the disconnect switch part. The heights of the fixed contact and the driving mechanism of the disconnect switch part and the height of the upper end of the common supporting insulator supporting the breaker are selected to be substantially the same.

A power switch apparatus in accordance with the present invention is of a type including a disconnect switch part and a breaker part, and comprises:

a common frame, a fixed contact supporting insulator mounted at one end thereof on the common frame, a fixed contact supported on the other end of the fixed contact supporting insulator, a common supporting insulator mounted at one end thereof on the common frame disposed apart from the fixed contact supporting insulator, the other end of the common supporting insulator being at substantially the same height as that of the other end of the fixed contact supporting insulator, driving means mounted on the other end of the common supporting insulator, disposed at substantially the same height as that of the other end of the fixed contact supporting insulator, a moving contact movably mounted on the driving means, in a manner to contact the free end thereof to the fixed contact when driven by the driving means, a driving insulator connected at one end thereof to the driving means, for making the latter drive the moving contact in response to a motion thereof, and a breaker mounted on the other end of the common supporting insulator.

Still other objects of the present invention will become readily apparent to those skilled in this art from the following description wherein there is shown and described a preferred embodiment of this invention, simply by way of illustration of one of the modes and alternative embodiments best suited to carry out the invention. As it will be realized, the invention is capable of still other different embodiments, and its several details are capable of modifications in various, obvious aspects all without departing from the invention. Accordingly, the drawings and descriptions will be regarded as illustrative in nature and not as restrictive.

DESCRIPTION OF THE PREFERRED EMBODIMENTS

Figure 2:
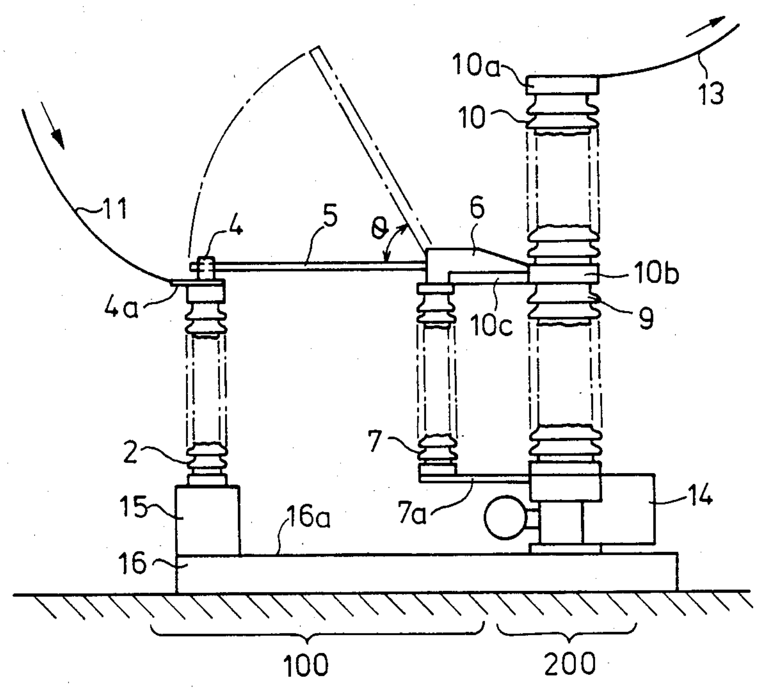
FIG. 2 is a side elevation view of a first embodiment of the present invention.

Hereinafter, a first embodiment of the present invention is described with reference to FIG. 2 which is a side elevation view. A first supporting insulator 2 of a disconnect switch part is mounted on a height adjusting adapter 15 with bolts or the like fixing means upon an upper face 16*a* of a common lateral frame 16. On the top of the supporting insulator 2 is mounted a terminal 4*a* and thereon a U-shaped fixed contact 4 for connecting a power receiving line 11. On the same upper face 16*a* of the lateral frame 16 are mounted with bolts or the like fixing means, a known breaker driving means 14 and a common supporting insulator 9. A lower terminal 10*b* is mounted on the common supporting insulator 9, and further mounted thereon, is a breaker 10 and an upper terminal 10*a* for connection to a feeding wire 13. A driving mechanism 6 is fixed on the lower terminal 10*b* of the breaker 10, and a driving insulator 7 is connected thereto so as to drive a moving contact 5 between an ON position contacting the fixed contact 4 shown by solid lines, and an OFF position shown by chain lines. The moving contact 5 pivots downward and twists when thrown into a receiving space in the U-shaped fixed contact 4. The driving mechanism 6 drives contact 5 to the ON position and to the OFF position as well as controls twisting. The driving force is conveyed in the form of rotation of the driving insulator 7, rotatably held by a supporting part 7*a*, and is driven to rotate by a known driving source (which is disposed around the lower end of the driving insulator 7, but is not shown in the drawing). The driving mechanism 6 is held by a suitable fixing means such as a screw on a connector metal plate 10*c*, which in turn may be connected to the lower terminal 10*b* by a screw or the like fixing means or alternatively may be detachably fixed both to the lower terminal 10*b* and the driving means 6.

The first supporting insulator 2, the fixed contact 4, the moving contact 5, the driving mechanism 6 and the driving insulator 7 constitute a disconnecting switch part 100. A breaker driving means 14, the common supporting insulator 9 and the breaker 10 constitute a breaker part 200. When the disconnect switch part 100 and the breaker part 200 are both switched on, electric power is fed through the power receiving line 11 fixed contact 4, the moving contact 5, the driving mechanism 6, the lower terminal 10*b*, the breaker 10, the upper terminal 10*a*, and the power feeding line 13, to an electric load (not shown). The breaker driving means 14 handles the breaker by a vertically disposed driving rod of the breaker 10, using e.g. compressed air power.

An important feature of the power switch apparatus example embodying the present invention is that the vertical positions of the upper end of the first supporting insulator 2, the upper end of the driving insulator 7 and the upper end of the common supporting insulator 9 are at almost the same level. Thus, when the disconnect switch is in an ON state, the moving contact 5 is substantially horizontal. When the moving contact 5 is raised to open the disconnect switch, the opening angle $\theta$ of the moving contact is selected to be less than 90° thereby assuring sufficient spatial insulation distance between the upper terminal 10*a* of the breaker 10 and the moving contact 5. The above-mentioned driving mechanism 6 and the moving contact 5 are held by a connection plate 10*c*, the lower terminal 10*b* and a supporting arm 7*a*, to the upper and the lower end of the common supporting insulator 9. The supporting arm 7*a* is fixed to the lower end of the common supporting insulator 9 by bolts or the like means, but this may be fixed to the breaker driving means 14 by bolts or the like means. The direction of the ON-OFF motion of a moving contact (not shown) of the breaker 10 and the direction of movement of the driving rod (not shown) of the breaker 10 are both vertical, and they are disposed axially with the common supporting insulator 9 to prevent undesirable bending motion to be applied to the common supporting insulator 9.

In the power switch apparatus in accordance with the present invention, the driving mechanism 6 and the lower terminal 10*b* of the breaker 10 are not only electrically connected but also are mechanically connected to each other. By fixing the connection plate 10*c* to the lower terminal 10*b* which in turn is fixed on top of the common supporting insulator 9, it is possible to sufficiently assure spatial insulation distance between the driving mechanism 6 and the upper terminal 10*a*, in comparison with a hypothetical superficial decreased area design wherein the disconnect switch part 100 and breaker part 200 in the conventional example of FIG. 1 are merely close to each other.

Accordingly, the present invention enables approximation of the disconnect switch part and the breaker part without fear of decreasing insulation; in other words, the setting-up area can be made sufficiently small.

Figure 1:
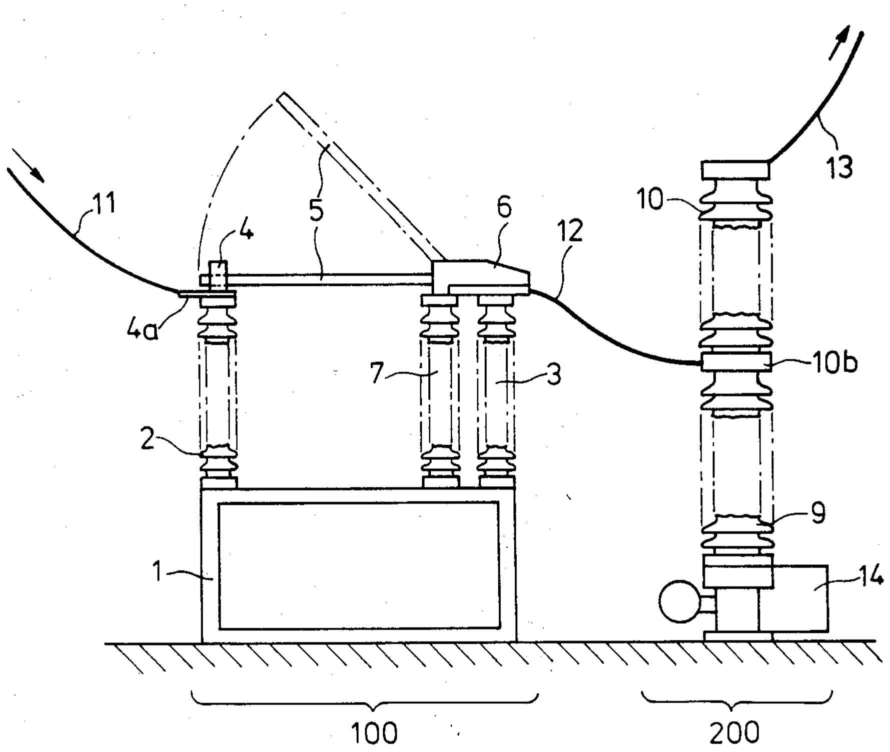
FIG.1 (Prior Art)
FIG. 1 is a side elevation view of a prior art power switch apparatus.

Furthermore, in comparison with the conventional configuration shown in FIG. 1, the second supporting insulator 3 has been eliminated in the embodiment of the present invention, enabling the setting-up area to be further reduced and further simplifying the setting-up work. In addition, because the embodiment in accordance with the present invention has no internal connection wire like the connection wire 12 of the conventional example of FIG. 1, the setting-up work is further simplified. Moreover, since the disconnect switch part 100 and the breaker part 200 are constructed on a rigid lateral frame 16, the height relation between the fixed contact 4 and the pivoted part (not shown) of the moving contact 5 is kept accurate; there is no fear of unstable operation of the disconnect switch part 100 and there is no mis-matching between the fixed contact 4 and the moving contact 5 or between mechanism 6 and the connection plate 14.

Figure 3:
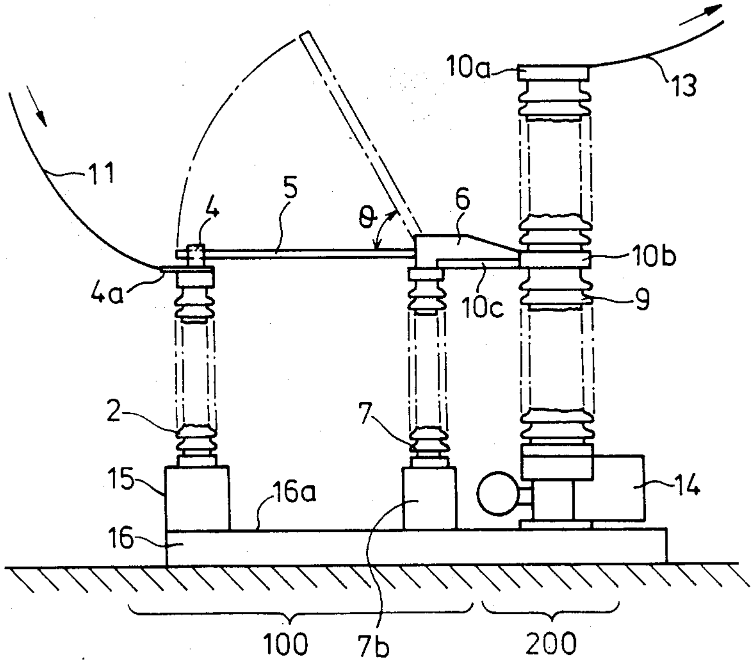
FIG. 3 is a side elevation view of a second embodiment of the present invention.

FIG. 3 shows another embodiment in accordance with the present invention. In this embodiment, as well as in the following embodiments, parts and components corresponding to those of the first embodiment are designed by the corresponding numerals. A feature of this second embodiment is that a driving insulator 7 is held rotatably on a height adjustable adapter **7*b* in turn mounted on the upper face 16*a* of a common frame 16 instead of being held by a supporting arm 7*a* fixed to the lower end of a common supporting insulator 9**.

Figure 4:
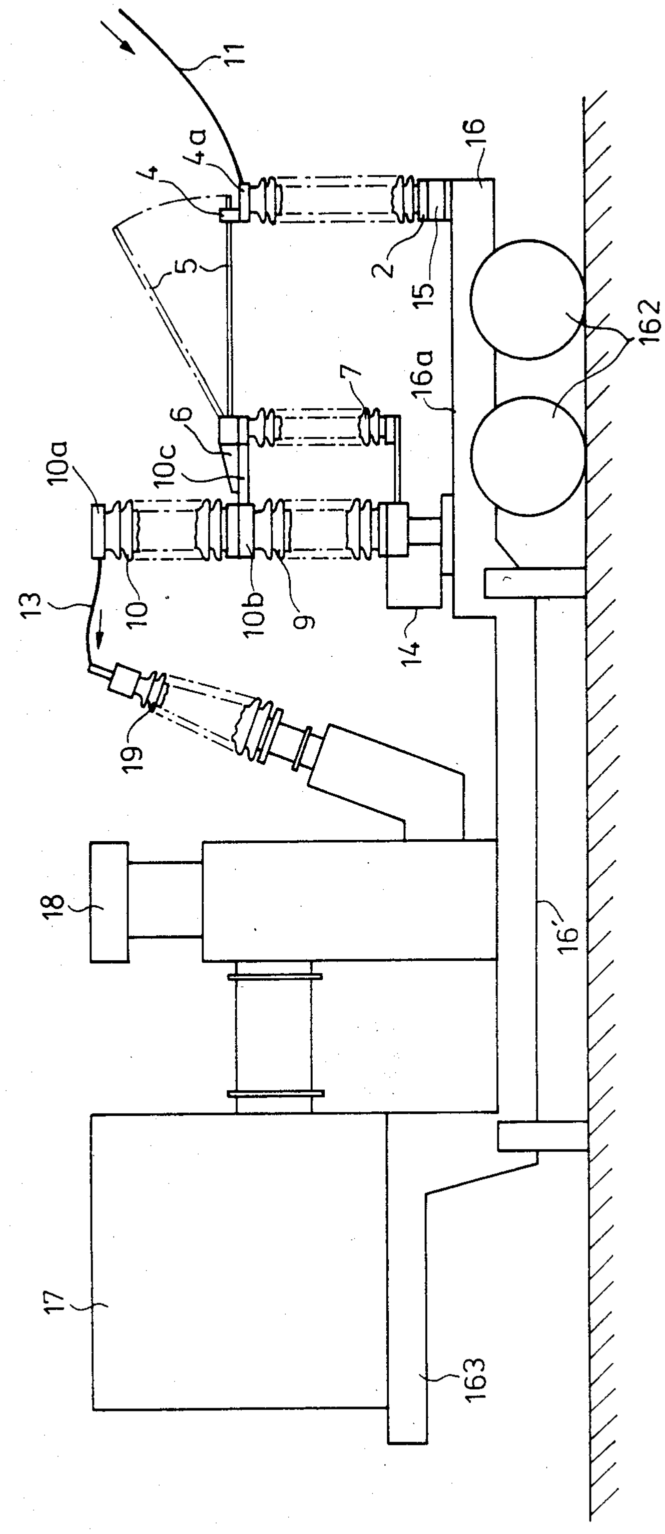
FIG. 4 is a side elevation view of a third embodiment of the present invention.

FIG. 4 shows still another embodiment in accordance with the present invention. A feature of this embodiment is that a common lateral frame 16 is a part of a trailer chassis 16′ wherein, on one end 163 of the trailer chassis 16′ a low tension cubicle (switch and meter board unit) 17 is provided and at the center part of the trailer chassis 16′, a transformer 18 is provided. A bushing 19 of the transformer 18 is connected to an upper terminal **10*a* of a breaker 10 through the power feeding line 13. An upper terminal 4*a* of the first supporting insulator 2 is connected via a power receiving line 11** to a high tension line.

Figure 5:
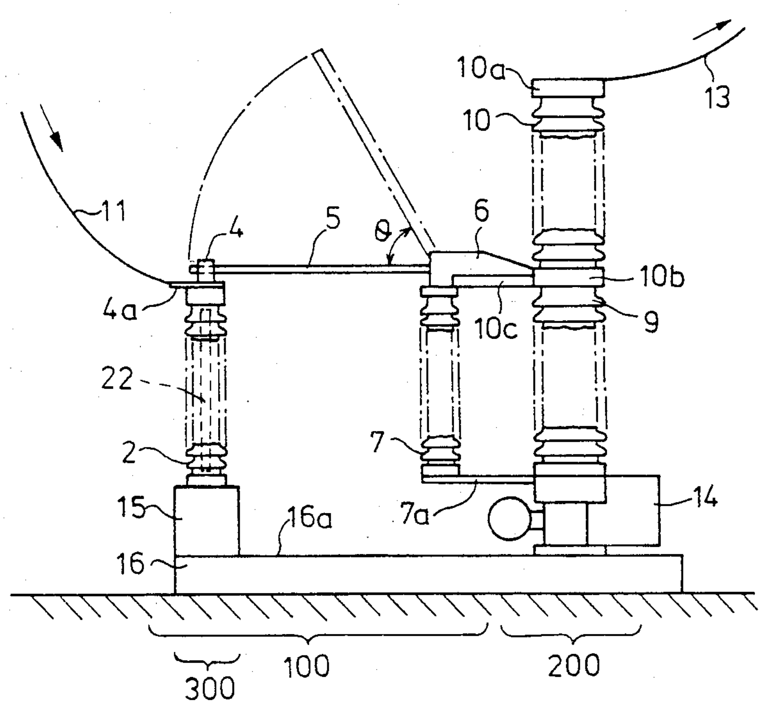
FIG. 5 is a side elevation view of a fourth embodiment of the present invention.

FIG. 5 shows another type of embodiment in accordance with the present invention. A feature of this embodiment is that the first supporting insulator 2, which supports a fixed contact 4 and a terminal **4*a* for connection to a power receiving line 11 fixed on a common lateral frame 16 with a height adjusting adapter 15 therebetween, forms a lightning arrester. The arrester is made by locating a known lightning arrester element 22 in a vertical through-hole in the supporting insulator 2. Accordingly, the power switch apparatus of the present embodiment can be made compact by incorporating a lightning arrester part 300 in the input end part in addition to a disconnect switching part 100 and a breaker part 200**.

Figure 6:
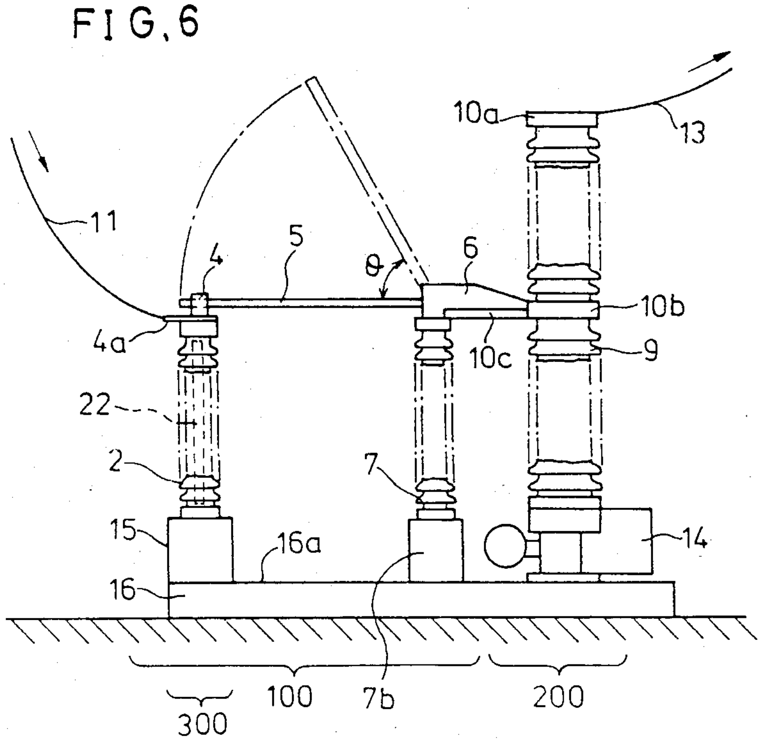
FIG. 6 is a side elevation view of a fifth embodiment of the present invention.

FIG. 6 shows still another embodiment in accordance with the present invention. A feature of this embodiment is that a driving insulator 7 is held rotatably on a height adjustable adapter **7*b* mounted on the upper face 16*a* of the common frame 16 instead of being held by a supporting arm 7*a* fixed to the lower end of a common supporting insulator 9**.

Figure 7:
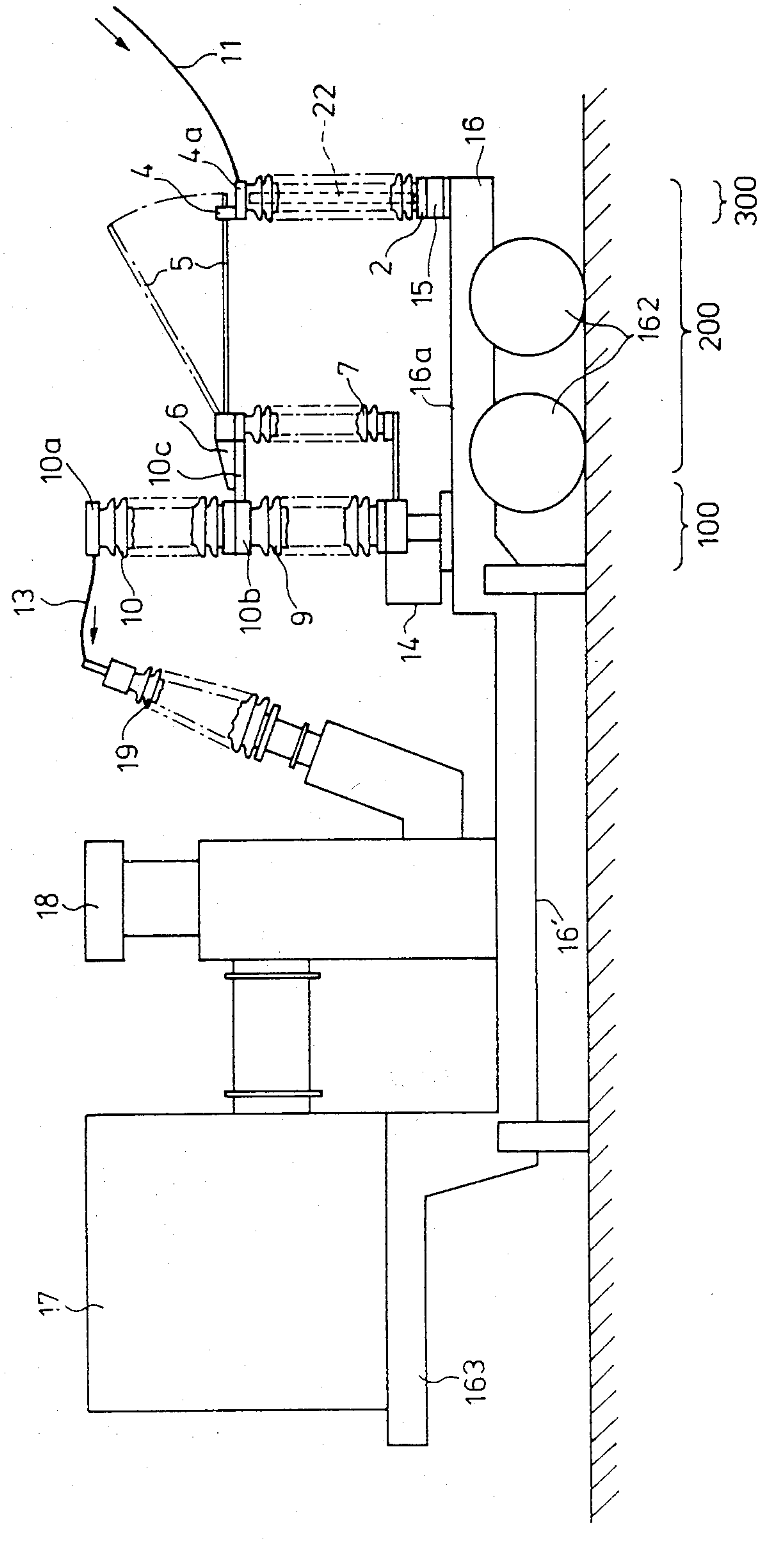
FIG. 7 is a side elevation view of a sixth embodiment of the present invention.

FIG. 7 shows still another embodiment in accordance with the present invention. A feature of this embodiment is that the common lateral frame 16 is a part of a trailer chassis 16′ wherein on one end 163 of the trailer chassis 16′ a low tension cubicle (switch and meter board unit) 17 is provided, and at the center part of the trailer chassis 16′, a transformer 18 is provided. A bushing 19 of the transformer 18 is connected to an upper terminal **10*a* of a breaker 10 through the power feeding line 13. An upper terminal 4*a* of the first supporting insulator 2 is connected via a power receiving line 11** to a high tension line.

For use in the actual three phase power system, the above-described disconnect switch part 100 as well as the breaker part 200 and the lightning arrester part 300 are provided for each of three phases.

As has been described, the present invention reduces the setting-up area of power switch apparatus by unifying a supporting insulator of a disconnect switch driving mechanism and a supporting insulator of a breaker into one common supporting insulator. The vertical positions of the fixed contact and the driving mechanism of the disconnect switch part, and of the upper end of the common supporting insulator supporting the breaker are selected to be substantially the same. In addition, the above-mentioned configuration makes spatial insulation distance between the disconnect switch part and the breaker part, and consequently the working room or setting-up area, sufficiently assured. Furthermore, the simple structure is advantageous for transportation, and decreases component count, hence cost, in a power switch apparatus of the type having a combination individual disconnect switch part and individual breaker part.

The foregoing description of several preferred embodiments of the invention have been presented for purposes of illustration and description. They are not intended to be exhaustive or to limit the invention to the precise forms disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. It is intended that the scope of the invention be defined by the claims appended hereto.

What is claimed is:

1. A power switch apparatus including a disconnect switch part and a breaker part, comprising:

- a common frame;
- a fixed contact supporting insulator mounted at one end thereof on said common frame;
- a fixed contact supported on the other end of said fixed contact supporting insulator;
- a common supporting insulator having one end thereof mounted on said common frame apart from said fixed contact supporting insulator, the other end of said common supporting insulator being at substantially the same height as that of said other end of said fixed contact supporting insulator;
- driving means mounted on said other end of said common supporting insulator, disposed at substantially the same height as that of said the other end of said fixed contact supporting insulator;
- a moving contact movably mounted on said driving means and positioned to establish contact between the free end of said moving contact and said fixed contact when said moving contact is driven by said driving means;
- a driving insulator having one end thereof connected to said driving means, said driving means driving said moving contact through said driving insulator; and
- a breaker mounted on said other end of said common supporting insulator.

2. A power switch in accordance with claim 1, wherein the other end of said driving insulator, opposite said one end, is mounted on said one end of said common supporting insulator.

3. A power switch in accordance with claim 1, wherein the other end of said driving insulator, opposite said one end, is mounted on said common frame.

4. A power switch in accordance with claim 1, wherein the other end of said driving insulator, opposite said one end and said other end of said fixed contact supporting insulator, are mounted on a common frame with respective height adjusting adapters therebetween.

5. A power switch in accordance with claim 1, wherein said fixed contact supporting insulator and said common supporting insulator are mounted on said common frame.

6. A power switch in accordance with claim 1, wherein said common frame is a part of a trailer chassis.

7. A power switch in accordance with claim 1, wherein said fixed contact supporting insulator has a lengthwise through-hole therein and contains a lightning arrester element in said lengthwise through-hole, and said lightning arrester element is connected across said fixed contact and a power receiving terminal connected to said fixed contact and a ground.

8. A power switch in accordance with claim 7, wherein the other end of said driving insulator, opposite said one end, is mounted on said one end of said common supporting insulator.

9. A power switch in accordance with claim 7, wherein the other end of said driving insulator, opposite said one end, is mounted on said common frame.

10. A power switch in accordance with claim 7, wherein the other end of said driving insulator, opposite said one end and said other end of said fixed contact supporting insulator, are mounted on a common frame with respective height adjusting adapters therebetween.

11. A power switch in accordance with claim 7, wherein said fixed contact supporting insulator and said common supporting insulator are mounted on said common frame.

12. A power switch in accordance with claim 7, wherein said common frame is a part of a trailer chassis.

* * * * *